(12) United States Patent
Gong

(10) Patent No.: US 7,093,134 B1
(45) Date of Patent: Aug. 15, 2006

(54) METHOD AND APPARATUS FOR SIGNING AND SEALING OBJECTS

(75) Inventor: Li Gong, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/607,514

(22) Filed: Jun. 28, 2000

Related U.S. Application Data

(63) Continuation of application No. 08/865,556, filed on May 29, 1997, now abandoned.

(51) Int. Cl.
*H04L 9/00* (2006.01)

(52) U.S. Cl. ............... 713/180; 713/181; 713/176; 713/170; 705/57; 380/282; 380/44; 380/30; 726/22

(58) Field of Classification Search ........... 380/282, 380/285, 44, 30; 705/57; 713/152, 165, 713/170, 176, 181, 180; 726/22
See application file for complete search history.

(56) References Cited

U.S. PATENT DOCUMENTS

| | | | | |
|---|---|---|---|---|
| 5,315,655 A | * | 5/1994 | Chaplin ........................ | 380/4 |
| 5,367,573 A | * | 11/1994 | Quimby ....................... | 380/25 |
| 5,390,247 A | * | 2/1995 | Fischer ........................ | 380/25 |
| 5,581,760 A | * | 12/1996 | Atkinson et al. ........... | 717/108 |
| 5,652,888 A | * | 7/1997 | Burgess ....................... | 709/318 |
| 5,692,047 A | * | 11/1997 | McManis .................... | 713/167 |
| 5,703,949 A | * | 12/1997 | Rosen .......................... | 380/21 |
| 5,745,570 A | * | 4/1998 | Voldal .......................... | 380/4 |
| 5,825,875 A | * | 10/1998 | Ugon ........................... | 380/4 |
| 5,893,077 A | * | 4/1999 | Griffin ......................... | 705/34 |
| 5,944,781 A | * | 8/1999 | Murray ........................ | 709/202 |

FOREIGN PATENT DOCUMENTS

| | | |
|---|---|---|
| EP | 0 638 860 A2 * | 2/1995 |
| EP | 0636860 | 2/1995 |
| EP | 0717337 | 6/1996 |

OTHER PUBLICATIONS

Microsoft Corproation: "Microsoft SQL Server in the Active Internet", Mar. 12, 1996, pp. 1-8.*
Zhang X N: "Secure Code Distribution" Computer, vol. 30, No. 6, Jun. 1997, pp. 76-79.
Galvin J M et al.: "Mime Object Security Services: Issues in a Multi-User Environment" Unix Security Symposium Proceedings, Jun. 5, 1995, pp. 217-223.
Van Doorn, Leendert et al.: "Secure Network Objects" Digital Systems Research Center, Palo Alto, California, USA, pp. 1-10.

* cited by examiner (Continued)

*Primary Examiner*—Emmanuel L. Moise
*Assistant Examiner*—Paul Callahan
(74) *Attorney, Agent, or Firm*—Martine Penilla & Gencarella, LLP

(57) ABSTRACT

Signed objects and sealed objects can be generated using embodiments of the invention. A signed object is an object that has an associated digital signature that can be used to authenticate the object. A sealed object is an object that is encrypted to limit access to only authorized entities. A signedObject class is used to create, maintain and authenticate a signed object. A sealed object is created, maintained, and authenticated using a sealedObject class. Nesting can be used to provide multiple levels of signing and/or sealing.

26 Claims, 9 Drawing Sheets

METHOD AND APPARATUS FOR SIGNING AND SEALING OBJECTS

CROSS-REFERENCE TO RELATED APPLICATIONS

This application is a continuation of application Ser. No. 08/865,556, filed on May 29, 1997 now abandoned. The disclosure of this application is incorporated herein by reference.

BACKGROUND OF THE INVENTION

1. Field of the Invention

This invention relates to signing and sealing objects.

2. Background Art

An object-oriented runtime environment includes objects that contain both behavior and state. An object's state at runtime evolves in the runtime environment. Because a runtime object evolves, it is considered to be "live." It may become necessary to distribute a runtime object across systemic boundaries. In a secure environment, it may be desired to first authenticate a distributed runtime object before it is used. A mechanism is needed for authenticating "live" objects. Further, a mechanism is needed to secure, or seal, a runtime object.

Authentication is a process used in secure systems for verifying static information. For example, authentication is used to verify the origin of the authenticated information. If the information is identified as being from a trusted source, the information is considered valid.

Authentication is typically performed by creating a signature that is attached to the information. A recipient uses the signature to verify the information. Typically, the originator of the information uses a private key (a key known only to the originator of the information and signature) to generate a digital signature that is attached to the information. The recipient of the information uses the attached signature and a public key (a key generated using the private key that is distributed to the public) to verify the signature thereby verifying the information.

There are many algorithms for signing information. The National Institute of Standards and Technology (NIST) has proposed the Digital Signature Standard (DSS) that uses the Digital Signature Algorithm (DSA). According to DSS and DSA, a signature is comprised of two parts, r and s, that are generated using a set of transformations that operate on a private key, a random number, the hash of the message, and three publicly-known parameters. The components of the signature, r and s, are sent to a recipient. To verify or authenticate the signature, the recipient generates a value for r using a public key (generated from the private key). The set of transformations performed by the recipient operate using s, the public key, the hash of the message, and the publicly-known parameters. If the value of r that is generated using the public key is the same as the value of r that is generated with the private key, the signature is verified.

The variables that are used in DSA are as follows:
p: 512–1024—bit prime number
q: 160—bit prime factor of p−1
h: a value less than p−1 and where $h^{(p-1)/q}$ mod p>1
g: $h^{(p-1)/q}$ mod p
y: $g^x$ mod p
x: <q The variable, x, is the private key and y is the public key. As can be seen from the variable definitions, the private key, x, is used to generate the public key, y. To generate a signature, a random number, k, is determined that is less than q. The signature is comprised of both r and s which are generated as follows:

$r = (g^k \bmod p) \bmod q$ $s = (k^{-1}(H(m)+xr)) \bmod q$

In calculating s, the information for which the signature is being created is input to a hash (e.g., using a one-way hash) function to generate H(m). Thus, the information is used to generate the signature. The signature is sent along with the information, or message, to the recipient. The recipient verifies the signature by computing a value for r, v. If v is the same as r, then the signature is verified. The recipient calculates v as follows:

$w = s^{-1} \bmod q$ $u_1 = (H(m)*w) \bmod q$ $u_2 = (rw) \bmod q$ $v = ((g^{u1}*y^{u2}) \bmod p) \bmod q$ The recipient uses the public key, y, to verify the signature. If the calculated signature, v, is the same as the signature, r, the signature is verified and the information is thereby verified. Thus, the information is authenticated by authenticating a signature attached to the information.

Another aspect of security is ensuring that the information itself is read only by authorized persons. Access to information that is considered sensitive is limited by encoding the information such that only an authorized person can decode the information. A system for encoding and decoding information is referred to as a cryptographic system (or cryptosystem).

A cryptographic system is a system for sending a message from a sender to a receiver over a medium so that the message is "secure", that is, so that only the intended receiver can recover the message. A cryptographic system (or cryptosystem) converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy (or may be created by a local user to ensure privacy).

One example of an encryption/decryption scheme is the Data Encryption Algorithm (DEA) defined in ANSI X3.92 and also referred to as the Data Encryption Standard (DES). The DEA uses arithmetic and logical operations on binary representations of the key and the information to perform the transformation. In a binary numbering system, numbers are represented as a series of binary digits, or bits. A bit can have a value of either zero or one. Thus, a key and the information to be transformed are represented as a series of zeroes and ones.

The DEA performs multiple iterations, or rounds, on a block of bits during the transformation. A block of the information, or data, 64 bits in length is operated on at one time. It is split in half and a permutation is performed on the right half to expand its 32-bits into 48 bits. A 48-bit representation of the key is selected for use in the transformation. The following are examples of the resulting key and data 48-bit portions:

|  | 1 2 3 4 5 6 7 8 9 | . . . | 46 47 48 |
| --- | --- | --- | --- |
| $key_{48}$ | 1 0 1 0 1 0 0 0 1 1 0 | . . . | 0 0 1 |
| $data_{48}$ | 0 0 1 1 0 0 1 0 0 0 1 | . . . | 1 0 1 |

The key and data portions are combined using an "exclusive-or" (XOR) logical operation. An XOR operation yields the value of one if and only if one of its operands is equal to one. For example, if the first bits in the key and data are XOR'd the result would be one. If the forty-eighth bits are XOR'd, the result would be zero. The XOR operation yields a 48-bit result each bit being the result of an XOR operation between two bits from the key and the data. A series of substitutions are performed on the XOR result which produce thirty-two new bits and a permutation is performed on the new bits. The result is XOR'd with the left half of the 64-bit block. The left and right halves are switched and another iteration, or round, begins. A more detailed explanation of the DEA is provided in Applied Cryptography: Protocols, Algorithms, and Source Code in C, Schneier, B., John Wiler & Sons, Inc. (1996) and is incorporated herein by reference.

The authentication mechanism currently available authenticates static information. A runtime object is not static. Similarly, the current encryption mechanisms are used to encrypt static information. A mechanism is needed for signing and/or sealing a "live" object such as one that exists in a runtime environment.

SUMMARY OF THE INVENTION

Embodiments of the invention is used to generate signed objects and sealed objects. A signed object is an object that has an associated digital signature that can be used to authenticate the object. A sealed object is an object that is encrypted to limit access to only authorized entities.

A signedObject class is defined that represents a "live" object. A "live" object is capable of reflecting changes made to the runtime state stored in the "live" object. A "live" object is a dynamic object in that its state (e.g., values associated with instance variables of the object) is capable of being changed. A snapshot of the "live" object is generated and stored within the signedObject. The signedObject further stores a signature that is associated with the snapshot of the "live" object. The signature can be generated using DSA, for example. A signed flag in the signedObject class indicates the status of the signedObject. When signed is true, the signature stored in the signedObject is a valid digital signature of the "live" object's snapshot.

The member fields of signedObject are private and can be accessed using public methods. The member fields of a signedObject are not capable of being manipulated beyond the methods of the signedObject. Once the "live" object is signed, it cannot be modified without causing the signature to be invalidated. For example, when the snapshot is modified, the signed flag is reset to false to indicate that the digital signature is no longer valid. Once a snapshot is taken of the "live" object, any further modifications to the object has no effect on the stored content in the signedObject.

To authenticate a "live" object, the signed flag is examined to determine whether signedObject includes a valid digital signature. A valid digital signature is retrieved from the signedObject. The digital signature is examined to determine whether it is genuine. If the digital signature is genuine, the "live" object's snapshot is retrieved from the signedObject and used to reconstruct the "live" object.

A sealedObject class is used to encrypt a "live" object. A snapshot of the "live" object is generated and stored in the sealedObject. The snapshot is encrypted using a public key. The encrypted snapshot is stored in the sealedObject. Once the snapshot is encrypted, the plaintext version of the snapshot is deleted from the sealedObject. To retrieve the encrypted object, the encrypted snapshot is retrieved from the sealedObject. A private key is used to decrypt the encrypted snapshot. The decrypted snapshot is used to reconstruct the "live" object. Like the signedObject class, the member fields, or variables, of the sealedObject class are publicly accessible through its member methods.

A combination of signing and sealing an object is possible using embodiments of the invention. For example, the snapshot of a "live" object is sealed by storing the snapshot and signature in a sealedObject instance. The snapshot is encrypted and the plaintext version of the snaphsot is deleted from the sealedObject. Before the snapshot is used to reconstruct the "live" object, the signature is used for authentication. To authenticate the object, the snapshot is decrypted to yield the plaintext. The plaintext is authenticated using DSS and DSA, for example. If authentic, the plaintext is used to reconstruct the "live" object.

Subclasses can be defined to allow multiple levels of signing. For example, multiple signatures can be placed on the same snapshot. In this case, existing method calls in the base class are fully compatible semantically. For example, a method that is designed to get a signature returns a single signature if there is only one signature, or returns one from a set of signatures if there is more than one signature.

DETAILED DESCRIPTION OF THE INVENTION

A method and apparatus for signing and sealing objects is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
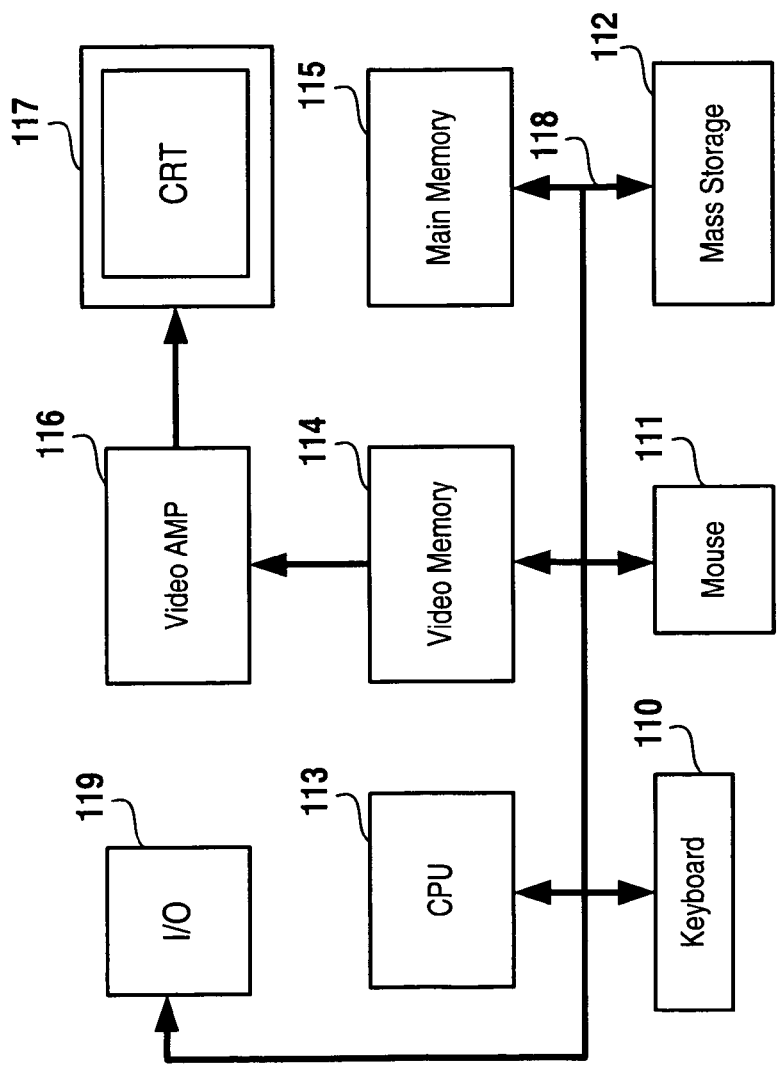
FIG. 1 provides an example of a general purpose computer that can be used in an embodiment of the invention.

Embodiments of the invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In an embodiment of this invention, the CPU 113 is a 32-bit microprocessor manufactured by Motorola, such as the 680X0 or Power PC processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The invention may be implemented in any type of computer system or programming or processing environment.

An embodiment of the invention is used to sign an object such that it can be authenticated. Embodiments of the invention can further be used to encrypt an object to limit access to the object. The sealing and signing mechanisms of the invention can be combined to create a signed, sealed object.

Object signing is a mechanism for creating a digitally signed version of an object that is unforgeable. A signed object can then be passed, for example, within or between runtime systems (e.g., a Java runtime system) as a verifiable authentic token or object. Other applications include use of signedObject internally to a runtime environment as an unforgeable authorization token that can be passed around without the fear that the token can be maliciously modified without being detected. A signedObject can be stored outside the runtime to store, for example, critical access control data on disk. Nesting is possible using embodiments of the invention to construct a logical sequence of signatures to, for example, establish a chain of authorization and delegation.

Figure 2:
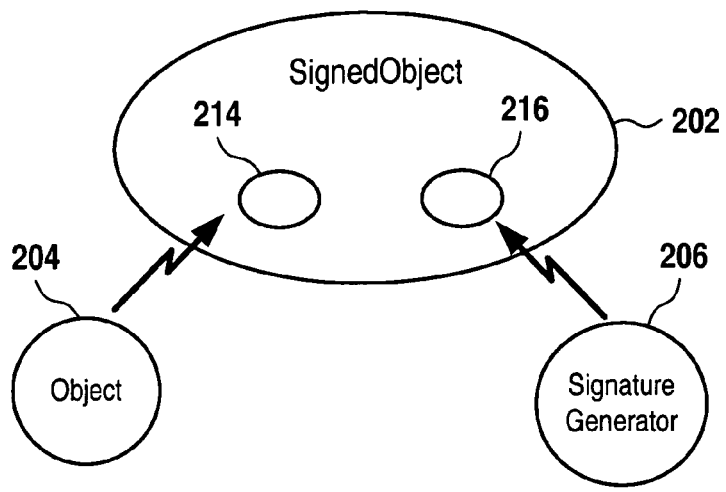
FIG. 2 provides an overview of a signedObject class according to an embodiment of the invention.

A signedObject class is defined to sign an object. FIG. 2 provides an overview of a signedObject class according to an embodiment of the invention. The signedObject class 202 is used to sign object 204 that is instantiated in a runtime environment. A snapshot of object 204 is created and stored in array 214. The snapshot includes the state of object 204. That is, for example, the snapshot includes the class of object 204, the class signature, and the values of all non-transient and non-static fields of object 204. A signature is generated by signature generator 206 and is stored in array 216 of signedObject 202.

Arrays 214 and 216 are publicly accessible via methods of signedObject 202. For example, signedObject 202 can limit access such that a request to modify array 214 is not allowed when a valid signature exists in array 216. Alternatively, a request to modify array 214 can be allowed, however, the valid signature in array 216 is invalidated as a result. Another method of signedObject 202 provides the ability to examine the status of array 216 (i.e., whether array 216 contains a valid signature). The contents of arrays 214 and 216 can be retrieved using methods of signedObject 202. Examples of the variables and methods of the signedObject class are provided in the section entitled "SignedObject Class."

The snapshot of object 204 stored in array 214 can be used to reconstruct object 204. The signature contained in array 216 is examined to verify authenticity (i.e., that the object originates from a trusted source). If the signature is authentic, the contents of array 214 are used to reconstruct object 204. For example, the contents of array 214 can contain the state of object 204 which is used to populate the fields of an instance of object 204. Alternatively, array 214 can include both the state and the behavior of object 204.

Figure 3:
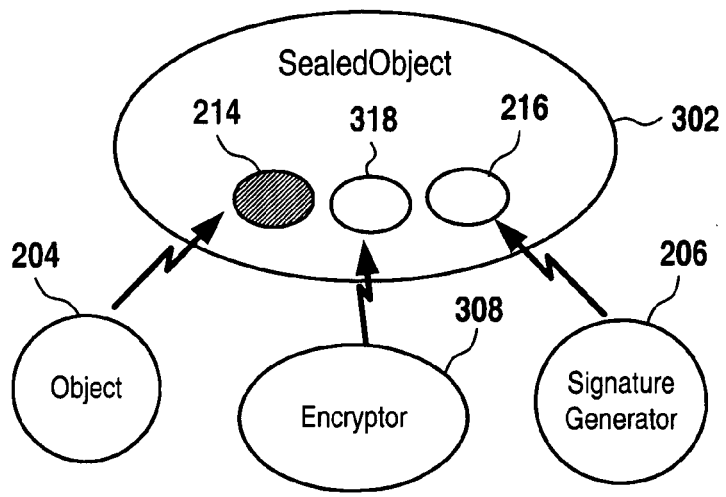
FIG. 3 provides an overview of a sealedObject class according to an embodiment of the invention.

Using embodiments of the invention, an object can be sealed in addition, or as an alternative, to signing an object. FIG. 3 provides an overview of a sealedObject class according to an embodiment of the invention. In the preferred embodiment of the invention, the sealedObject class is a subclass of signedObject class. Thus, the sealedObject class inherits the member fields and methods of the signedObject class. A sealedObject 202 is used to seal object 204 by encrypting the contents of object 204. A snapshot of object 204 is created and stored in array 214. The snapshot includes the state of object 204. That is, for example, the snapshot includes the class of object 204, the class signature, and the values of all non-transient and non-static fields of object 204. A signature is generated by signature generator 206 and is stored in array 216 of signedObject 202.

Arrays 214 and 216 are accessible via methods of signedObject 202. As a subclass of signedObject 202, sealedObject 302 includes the methods of signedObject 202 for modifying array 214, examining the status of array 216 (i.e., whether array 216 contains a valid signature), retrieving the contents of arrays 214 and 216, etc. An instance of sealedObject 302 further includes methods for encrypting and decrypting a snapshot of object 204. Other methods of sealedObject 302 provide the ability to determine the status of sealedObject 302 and to retrieve the contents of array 318. Examples of the variables and methods of the sealedObject class are provided in the section entitled "SealedObject Class."

Array 318 contains an encrypted version, i.e., ciphertext, for the snapshot of object 204. To encrypt object 204, a snapshot of object 204 is generated and stored in array 214. Encryptor 308 is used to encrypt the contents of array 214 using an encryption key. In the preferred embodiment, a public key system is used to sign or seal an object. For example, DSA is used to sign an object, and DES is used to seal an object. It should be apparent to one of ordinary skill in the art, however, that other systems can be used with the invention. The encrypted snapshot is stored in array 318. The contents of array 214 are then deleted such that the plaintext version of the snapshot is no long stored in sealedObject 302. That is, once a ciphertext version of object 204 is generated, the plaintext version of object 204 is deleted from sealedObject 302.

Preferably, a different public-private key pairs are used to sign and seal an object. If a single public-private key pair is used, it is necessary for the parties to know both the public and private key. That is, party A uses a private key to generate a signature while party B uses an associated public key to verify the signature. To seal an object, party A uses the public key to encrypt the object that party B decrypts using the private key. Therefore, if the same public-private key pair is used for both signing and sealing, parties A and B must know both keys in the public-private key pair. Alternatively, sealing can be performed using a classical cryptographic system.

Figure 4:
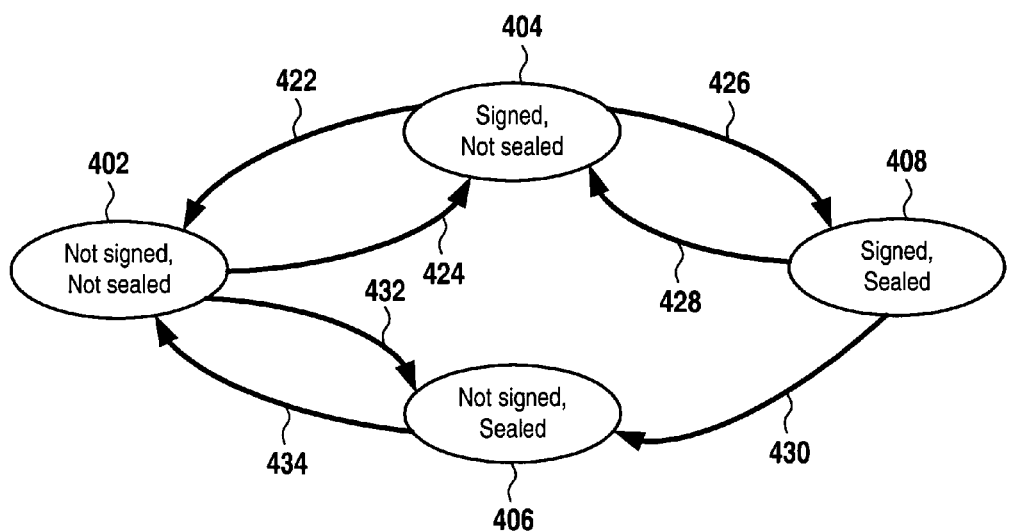
FIG. 4 provides an example of a state machine for an object according to an embodiment of the invention.

An object can be signed or sealed, or signed and sealed. For example, object 204 can be signed and sealed. FIG. 4 provides an example of a state machine for an object according to an embodiment of the invention. In state 402, object 204 is neither signed nor sealed. By undergoing transition 424, object 204 is signed and unsealed in state 404. Object 204 reverts to unsigned and unsealed in state 402 via transition 422. Similarly, object 204 changes, via transition 432, from state 402 (unsigned and unsealed) to state 406 wherein object 204 is sealed and unsigned. Object 204 reverts to state 402 (e.g., unsealed and unsigned) via transition 434.

In state 404, object 204 is signed and unsealed. State 408 is reached via transition 426 to sign and seal object 204. From state 408, object 204 can be unsealed via transition 428 (entering state 404) or unsigned via transition 430 (entering state 406). However, in the preferred embodiment, an unsigned, sealed object cannot be signed. As previously discussed, a signature is generated from the information that is to be signed. If the information is encrypted, the information is no longer available to generate a signature. Thus, as illustrated in FIG. 4, there is no transition from an unsigned, sealed state (e.g., state 406) to a signed and sealed state (e.g., state 408).

A transition from an unsigned, sealed state (state 406) to a signed, unsealed state (state 404) is accomplished, for example, via transitions 434 and 424 and state 402. A transition from a signed, unsealed state (state 404) to an unsigned, sealed state (state 406) is possible via states 402 (e.g., transitions 422 and 432) or 408 (e.g., transitions 426 and 430).

Serialization

To sign or seal an object, a snapshot of the object is taken using a process referred to as serialization. During serialization the contents of an object are retrieved from the object and saved in, for example, a file, a byte array, etc. Deserialization is used to restore the contents of an object. In the preferred embodiment, streaming is used to serialize (e.g., save the contents of) and deserialize (e.g., restore the contents of) an object.

A stream is a linear, sequential flow of data that is used to obtain independence from the actual, physical I/O device that is used. For example, the stream can be a file (e.g., for persistent storage of an object) or a network socket (e.g., to reconstitute an object on another host or in another process). An input stream is a stream of data that flows inward using read operations. An output stream has an outward flow by virtue of write operations.

Serialization is preferably implemented in an Application Programming Interface (API). In this case, an object can be serialized by declaring that the object is serializable (e.g., implements the serialization interface). The serialization mechanism for an object writes the class of the object, the class signature, and the values of all non-transient and non-static fields to an output stream. For example, when an object is serialized, the state of the object is saved by writing the individual fields to an output stream (e.g., an ObjectOutputStream) using a writeObject method. The de-serialization mechanism for an object reads the information written to the output stream. An example of a serializable interface is provided in the Java Development Kit version 1.1 available from Sun Microsystems, Inc. An object is deserialized by reading the fields from the output stream into the object using a readObject method. Information in the stream is used to assign the field of the object saved in the stream with the correspondingly named field in the current object.

SignedObject Class

The signedObject class is a class that represents a signed document. The signed document is another object (e.g., a Java runtime object) that is signed using an embodiment of the invention. A constructor method is used to construct an instance of the signedObject from any "content" object (e.g., a "live" or dynamic object). The content object is serialized and the result is stored in the signedObject instance. A signature field contains a digital signature that is associated with the content. A signed flag indicates whether the signature field of a signedObject instance contains a digital signature of the object's content.

All member fields, or variables, are private, and can be accessed via public methods. Thus, the internals of a signedObject are not manipulatable directly from the outside. Therefore, once the content is signed, it cannot be further modified without causing the status to become unsigned. Further, once the original object is serialized (e.g., a snapshot of the content object is taken), and stored in the signedObject, any further manipulation on the original object has no effect on the stored content. In the preferred embodiment, the "sign" and "verify" methods are final and cannot be modified by subclasses. This reduces the possibility of fraudulent software being created that does not correctly or honestly perform the signing and verification tasks.

The signedObject class includes a signature byte array, a content byte array and a signed flag. The signature byte array retains the value of the signature associated with a snapshot of a content object. The content byte array stores the content of the content object. The signed flag is used to specify whether the signature byte array contains a valid signature for the content.

The following are examples of methods of the signedObject class:

| Method Name | Modifier | Description |
| --- | --- | --- |
| getAlgorithm | Public | Retrieves the name of the signature algorithm. |
| getProvider | Public | Retrieves the name of the crypto provider |
| resetContent | Public | Changes the stored content, and causes the status to become unsigned whatever its previous status. Sets "signed" variable for the serialized object to "false" and calls setContent to set the content of the content array. |
| setContent | Private | Creates a stream pipeline from the object to the content byte array. Calls the writeObject method to serialize and copy the contents of the object to the content byte array. |
| getContent | Public | Retrieves the content object. A determination is made whether a copy of the "content" object has already been cached (n.b., the cached copy is already deserialized). If so, the cached copy is returned in response to the request. If not, the "content" object is deserialized, cached, and returned. That is, a stream pipeline is created to copy the contents of the content array to the object. |
| getSignature | Public | Retrieves the signature on the signed content. Returns the signature in a byte array, or null if the content is not yet signed. |
| setPublicKey | Public | Sets an information field that indicates the public key that corresponds to the signature key. This field is optional and for informational purposes only. |
| getPublicKey | Public | Retrieves the contents of an information field that indicates the public key that corresponds to the signature key. |
| sign | Public | Signs the "content" using a given signature key. An instance of a DSA signature is generated, for example. The "content" object's signed flag is set to "unsigned". The signature is updated using the generated signature. The signed flag for the "content" object is set to "signed". |
| verify | Public | Verifies the signature over the "content" |

Object Signing

Figure 5:
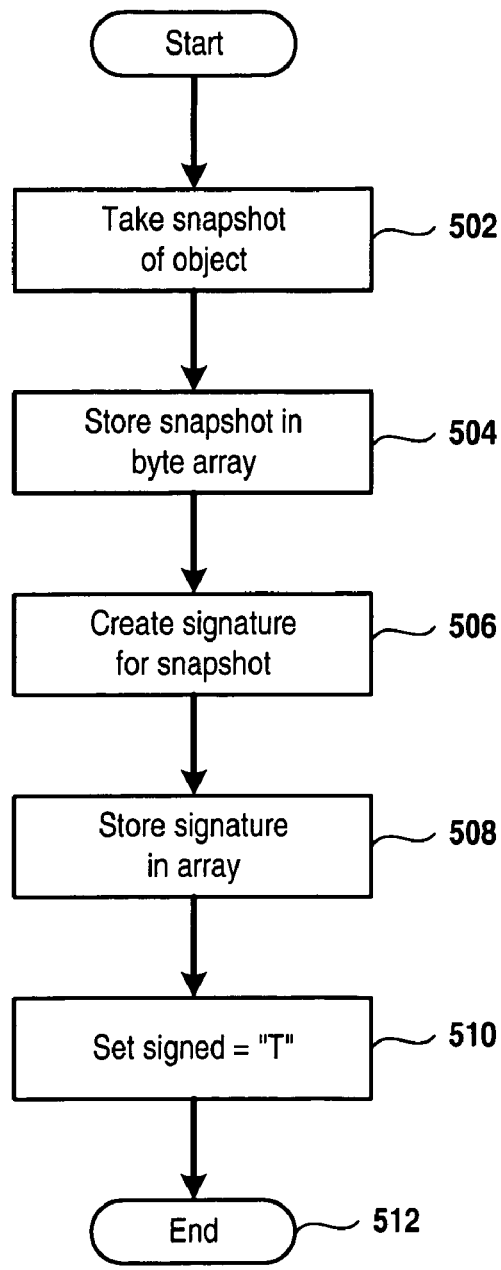
FIG. 5 provides an example of an object signing process flow according to an embodiment of the invention.

An object is stored in an instance of the signedObject class during object serialization. A signature that is associated with the serialized object is stored in the signedObject instance to sign the object. FIG. 5 provides an example of an object signing process flow according to an embodiment of the invention.

A snapshot of the object is taken at step 502. The snapshot is stored in the content byte array of a signedObject instance at step 504. The snapshot is generated and stored in the signedObject instance using a streaming technique, for example. Using a streaming technique, the contents of the object is output to a stream that is directed to the content byte array of the signedObject instance (e.g., using the writeObject serialization method).

At step 506, a signature is created for the snapshot using the DSA technique, for example. The signature is stored in the signature byte array of the signedObject instance at step 508. The signed flag in the signedObject instance is set to true at step 510. Processing ends at step 512.

As a result of the process flow of FIG. 5, a digital signature is attached to a content object.

Object Unsigning

Figure 6:
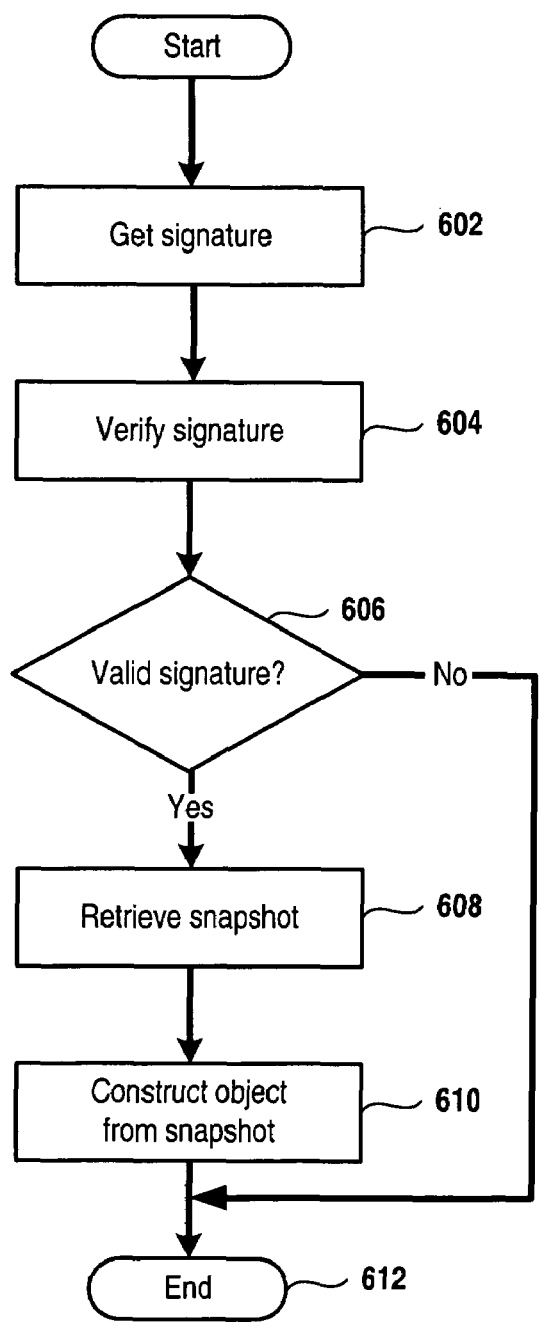
FIG. 6 provides an example of an object unsigning process flow according to an embodiment of the invention.

During deserialization, a signature that is associated with the serialized object is retrieved from the signedObject instance to authenticate the serialized object. If the authentication is successful, the serialized object is retrieved from an instance of the signedObject class to reconstruct the serialized object. FIG. 6 provides an example of an object unsigning process flow according to an embodiment of the invention.

At step 602, an object's signature is retrieved from the object's signedObject instance. The signature is verified at step 604 using DSA, for example. At step 604 (i.e., "valid signature?"), a determination is made whether the signature is authentic. If it is not, the object is considered to be inauthentic. Thus, there is no need to retrieve the object and processing ends at step 612.

If it is determined, at step 606, that the signature is authentic, it is assumed that the object is authentic. The object's snapshot is retrieved from the signedObject's content array step 608. The snapshot is used to reconstruct the object at step 610. The retrieval and use of the object's snapshot to reconstruct the object preferably uses the streaming technique. Using a streaming technique, the content byte array is output to a stream that is directed to the object's instance. Processing ends at step 612.

Accessing a Serialized Object

Figure 7:
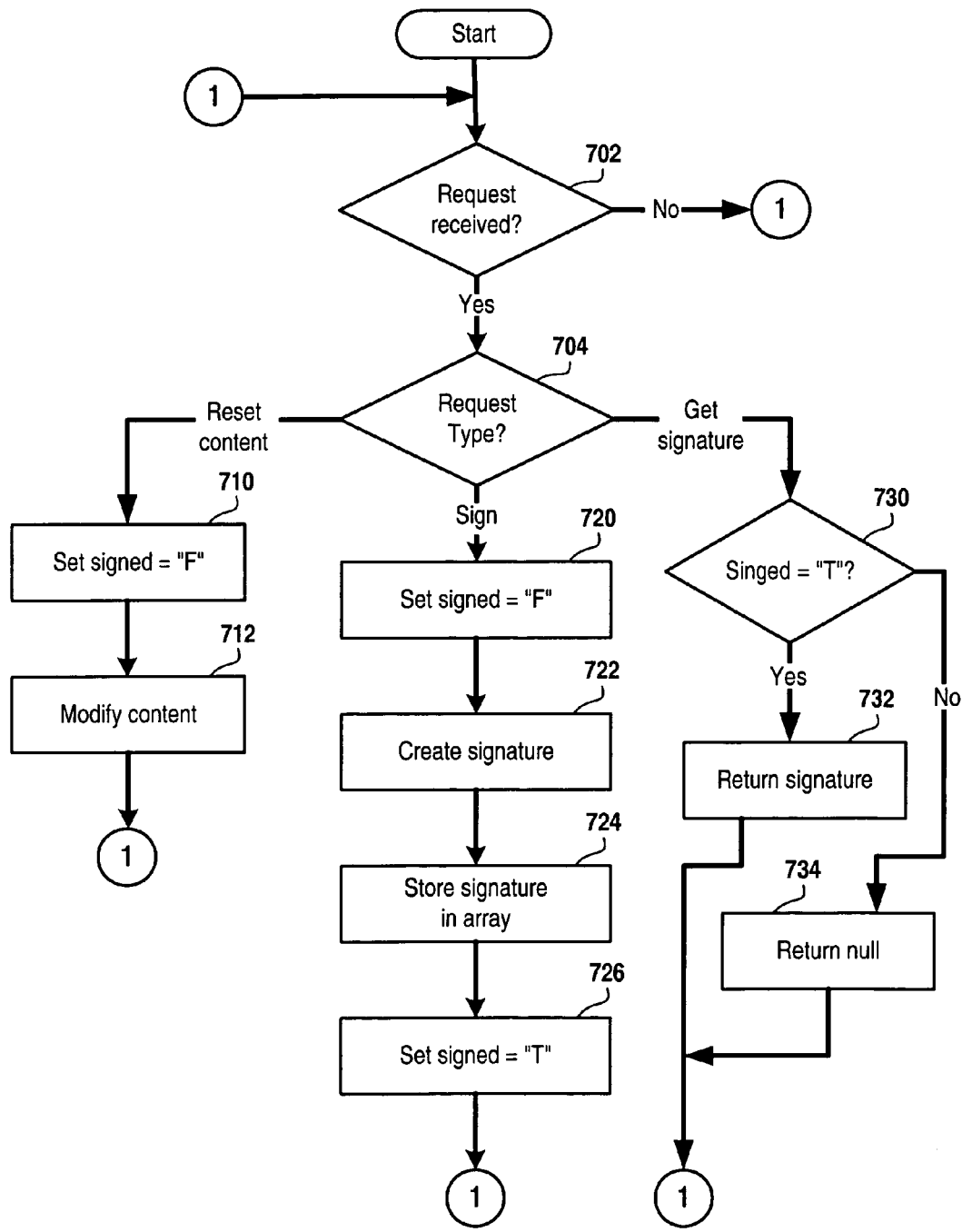
FIG. 7 provides an example of an access request management process flow according to one embodiment of the invention.

An object's content and signature is retained in the signedObject instance in member fields, or variables, that are publicly accessible through methods of the signedObject instance. Access requests are processed by the signedObject instance. FIG. 7 provides an example of an access request management process flow according to one embodiment of the invention.

The signedObject instance processes requests for services. At step 702 (i.e., "request received?"), a determination is made whether a request has been received. If not, processing continues at step 702. If a request is received by the signedObject instance, processing continues at step 704 (i.e., "request type?") to determine the type of request.

A "reset content" request is a request to modify the information stored in the signedObject's content array. That is, it is a request to modify the content object. If a "reset content" request is received, processing continues at step 710 to set the signed flag to false. A change in the content invalidates the signature. Therefore, the signed flag is set to false to indicate that the content is no longer signed. At step 712, the content is modified using the new content contained. Processing continues at step 702 to process any subsequent requests.

If a "sign" request is received, a modification of the information stored in the signature array is requested. A "sign" request is used to sign the content object or can be used after a "reset content" request to sign the modified content of an object, for example. Processing continues at step 720 to set the signed flag to false. A new signature is created at step 722 using the information stored in the content array and DSA, for example. At step 724, the new signature is stored in the signedObject's signature array. The signed flag is set to true. Processing continues at step 702 to handle any subsequent requests.

A "get signature" request is used to retrieve the information stored in the signedObject's signature array. A "get signature" request is used to retrieve the signature in anticipation of verifying the signature and object contents, for example. Processing of a "get signature" request continues at step 730 (i.e., "signed='T'?") to determine whether the signed flag is set to true. If not, there is no signature to return, and processing continues at step 734 to return a null value. If the signed flag is true, the signature contained in the signature array is returned at step 732. Processing continues at step 702 to process any subsequent requests.

SealedObject Class Definition

The sealedObject class is a class that represents a sealed document. The sealed document is the runtime object (e.g., a Java runtime object). A constructor constructs an instance of sealedObject from the runtime, or "content," object. The sealedObject class is a subclass of the signedObject class and inherits the member variables and methods of the signedObject class. Like the signedObject class, variables of the sealedObject class are all private and are publicly accessible using member methods.

The sealedObject class includes a signature byte array, a content byte array, and an encrypted content array. The signature byte array retains the value of the signature associated with a snapshot of a content object. The content byte array stores the content of the content object. The encrypted content array contains the ciphertext version of the object. Variables are used as flags to identify the signed status and sealed status of the content object. A signed flag is used to specify whether the signature byte array contains a valid signature for the content. A sealed flag is used to specify whether a ciphertext version of the object is stored in the sealedObject instance.

Like the signedObject class, the internals of a sealedObject are not manipulatable directly from the outside. The following are examples of methods of the sealedObject class:

| Method Name | Modifier | Description |
| --- | --- | --- |
| checkSealed | Public | Checks sealing status. Returns true, if sealed, and false otherwise. |
| getContent | Public | Retrieves the content, whether it is signed or not. Overrides the getContent method in the signedObject class. |
| getEncryptedContent | Public | Retrieves the encrypted content. Returns the encrypted content in a byte array, or null if the content is not yet sealed. |
| seal | Public | Seals the "content" using the given encryption key. |
| unseal | Public | Unseals the "content" using the given encryption key. |

Object Sealing

Figure 8:
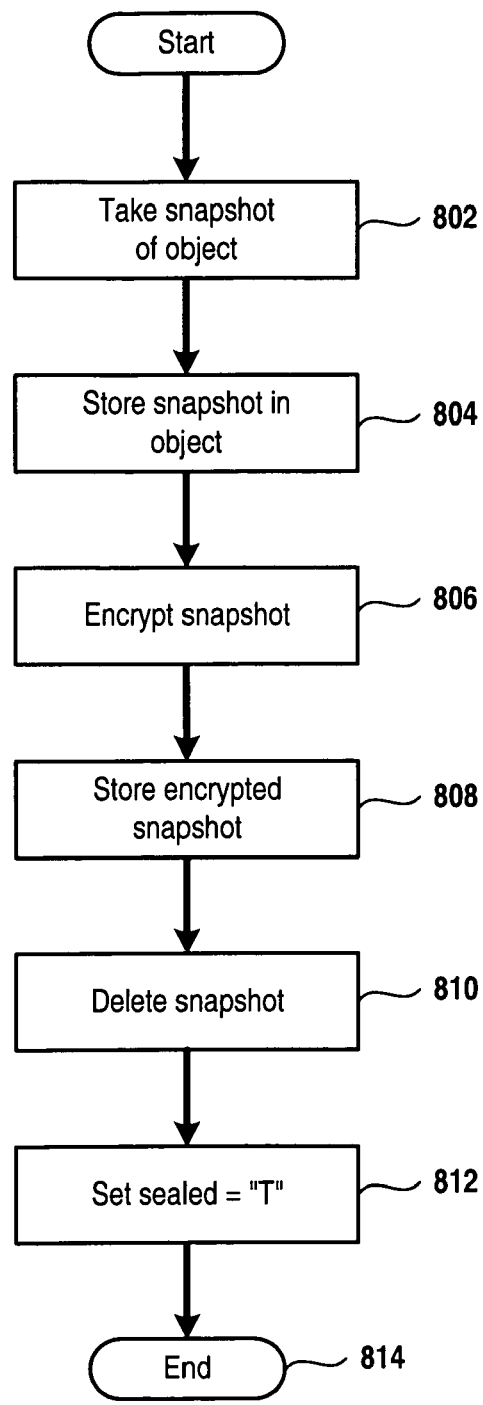
FIG. 8 provides an example of an object sealing process flow according to an embodiment of the invention.

To seal an object, the object is serialized and the serialization of an object is stored in an instance of the sealedObject class. The serialization is encrypted to generate ciphertext. The ciphertext is stored in the sealedObject instance in place of the object's serialization. FIG. 8 provides an example of an object sealing process flow according to an embodiment of the invention.

At step 802, a snapshot of the object is taken of the object. The snapshot is stored in the content array of an instance of the sealedObject class at step 804. At step 806, the snapshot is encrypted to generate a ciphertext version of the object. The ciphertext is stored in the encrypted content array at step 808. At step 810, the plaintext version of the snapshot is deleted from the sealedObject's content array. At step 812, the sealed flag is set to true. Processing ends at step 814.

Object Unsealing

Figure 9:
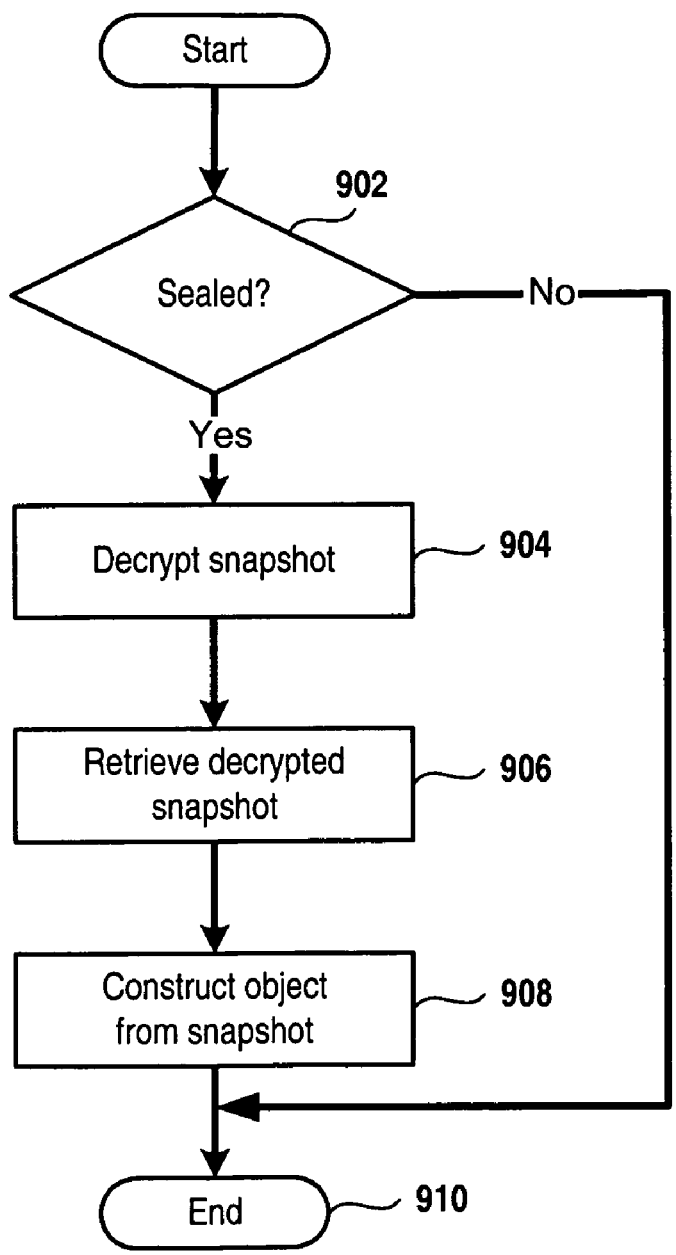
FIG. 9 provides an example of an object unsealing process flow according to an embodiment of the invention.

To unseal an object, the ciphertext version of a serialized object is decrypted to yield the plaintext serialization. The plaintext serialization is used to reconstruct the sealed object. FIG. 9 provides an example of an object unsealing process flow according to an embodiment of the invention.

At step 902 (i.e., "sealed?"), a determination is made whether the sealedObject contains an encrypted version of the object's snapshot. That is, the sealed flag is examined to determine the status of the sealedObject instance. If the sealed flag indicates that the sealedObject instance does not contain ciphertext, processing ends at step 910. If the sealed flag is true, processing continues at step 904 to decrypt the ciphertext to yield the plaintext version of the object using DES, for example. At step 906, the plaintext is retrieved.

At step 908 the plaintext version of the object is used to reconstruct the object. For example, the streaming technique is used to output the plaintext from the sealedObject instance to the reconstructed object. Processing ends at step 910.

Signing and Sealing an Object

Figure 10:
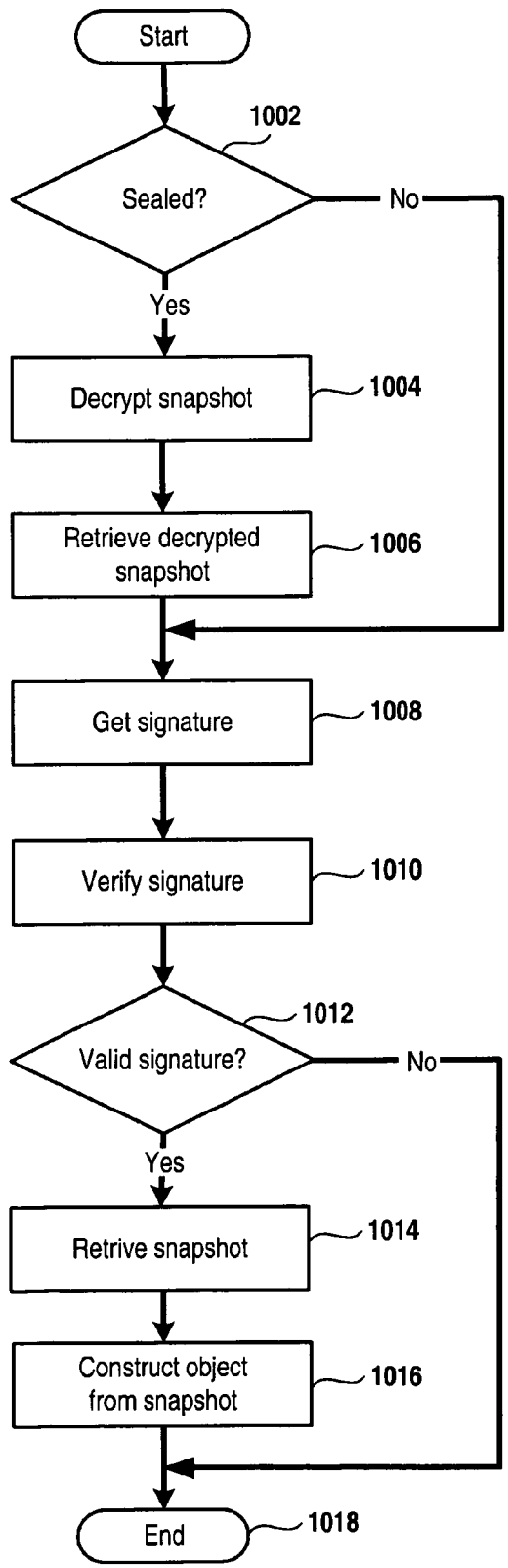
FIG. 10 provides an example of a process flow for unsigning and unsealing an object according to an embodiment of the invention.

An object can be both signed and sealed using embodiments of the invention. FIG. 5 provides an example of a process flow for serializing and signing a "live" object. FIG. 8 can be used to seal an object. A signed, sealed object is unsigned and unsealed before it is used. FIG. 10 provides an example of a process flow for unsigning and unsealing a signed, sealed object according to an embodiment of the invention.

A signed, sealed object is unsealed and the plaintext is used to unsign the object. Alternatively, a signed, sealed object can be unsealed and then unsigned. At step 1002 (i.e., "sealed?"), a determination is made whether the sealed flag indicates that the object is sealed. If not, processing continues at step 1008 to unsign the object. If so, processing continues at steps 1004 and 1006 to decrypt the ciphertext of the object and store the plaintext in the sealedObject instance.

At step 1008, the signature associated with the object is retrieved. The signature is verified at step 1010. At step 1012 (i.e., "valid signature?"), a determination is made whether the signature is authentic. If not, processing ends at step 1018. If the signature is authentic, processing continues at step 1014 to retrieve the plaintext version of the object that is used in step 1016 to reconstruct the object.

Thus, a method and apparatus for signing and sealing objects has been provided in conjunction with one or more specific embodiments. The invention is defined by the claims and their full scope of equivalents.

The invention claimed is:

1. A method for signing a live object comprising:
    instantiating a live object in a runtime environment, wherein said live object includes one or more non-static fields, each of said one or more non-static fields capable of including non-static information that can change during instantiation of said live object in said runtime environment;
    taking a snapshot of said live object, wherein said taking said snapshot is performed by serializing a state of said live object, the state of said live object including information present in said non-static fields at the moment said snapshot is taken;
    associating a signature with said snapshot;

maintaining said association between said snapshot and said signature;

verifying said signature; and constructing a new object using said snapshot, when said signature is verified.

2. The method of claim 1 further comprising:

storing said snapshot in another object; and storing said signature in said another object.

3. The method of claim 1 further comprising:

monitoring a status of said snapshot; and invalidating said signature when said status of said snapshot changes.

4. The method of claim 1 further comprising:

creating said signature using said snapshot.

5. The method of claim 4 further comprising:

associating a second signature with said snapshot.

6. The method of claim 5 further comprising:

verifying said second signature; and constructing a new object using said snapshot, when said second signature is verified.

7. The method of claim 1 further comprising:

generating an encryption key;

generating an encrypted snapshot of said snapshot;

deleting said snapshot; and associating said signature with said encrypted snapshot, said signature previously being associated with said snapshot.

8. The method of claim 7 further comprising:

maintaining said association between said encrypted snapshot and said signature associated with said encrypted snapshot.

9. The method of claim 8 further comprising:

verifying said signature associated with said encrypted snapshot; and constructing a new object using encrypted said snapshot, when said signature associated with said encrypted snapshot is verified.

10. A computer program product for signing a live object comprising a computer readable medium having recorded thereon:

computer program code for causing a computer to instantiate a live object in a runtime environment, wherein said live object includes one or more non-static fields, each of said one or more non-static fields capable of including non-static information that can change during instantiation of said live object in said runtime environment;

computer program code for causing a computer to take a snapshot of said live object by serializing a state of said live object, the state of said live object including information present in said non-static fields at the moment said snapshot is taken;

computer program code for causing a computer to associate a signature with said snapshot;

computer program code for causing a computer to maintain said association between said snapshot and said signature;

computer program code for causing a computer to verify said signature; and computer program code for causing a computer to construct a new object using said snapshot, when said signature is verified.

11. The computer program product of claim 10 further comprising:

computer program code for causing a computer to store said snapshot in another object; and computer program code for causing a computer to store said signature in said another object.

12. The computer program product of claim 10 further comprising:

computer program code for causing a computer to monitor a status of said snapshot;

computer program code for causing a computer to invalidate said signature when said status of said snapshot changes.

13. The computer program product of claim 10 further comprising:

computer program code for causing a computer to create said signature using said snapshot.

14. The computer program product of claim 10 further comprising:

computer program code for causing a computer to associate a second signature with said snapshot.

15. The computer program product of claim 14 further comprising:

computer program code for causing a computer to verify said second signature; and computer program code for causing a computer to construct a new object using said snapshot, when said second signature is verified.

16. The computer program product of claim 10 further comprising:

computer program code for causing a computer to generate an encryption key;

computer program code for causing a computer to encrypt said snapshot;

computer program code for causing a computer to delete said snapshot; and computer program code for causing a computer to associate said signature with said encrypted snapshot, said signature previously being associated with said snapshot.

17. The computer program product of claim 16 further comprising:

computer program code for causing a computer to decrypt said encrypted snapshot.

18. The computer program product of claim 16 further comprising:

computer program code for causing a computer to maintain said association between said encrypted snapshot and said signature associated with said encrypted snapshot.

19. The computer program product of claim 18 further comprising:

computer program code for causing a computer to verify said signature associated with said encrypted snapshot; and computer program code for causing a computer to construct a new object using said encrypted snapshot, when said signature associated with said encrypted snapshot is verified.

20. A system configured to sign a live object existing in a runtime environment, said system comprising:

a first module of program code executing on a computer configured to take a snapshot of a live object, wherein said snapshot is a serialization of a state of said live object, wherein said live object includes one or more non-static fields, each of said one or more non-static fields capable of including non-static information that can change during existence of said live object in said runtime environment, said state of said live object including information present in said non-static fields at the moment said state of said live object is taken;

a second module of program code executing on said computer configured to generate a signature using said snapshot, said first module configured to monitor a status of said snapshot, and to invalidate said signature when said snapshot is changed; and a sealing module including,
- a key generation module configured to generate an encryption key,
- an encryption module configured to generate an encrypted snapshot from said snapshot, and
- a deletion module configured to delete said snapshot, wherein said second module is configured to invoke said key generation module, said encryption module, and said deletion module, wherein said second object is configured to verify said signature and construct a new object using said encrypted snapshot when said signature is verified.

21. The system of claim 20 wherein said first and second modules are implemented as a second object.

22. The system of claim 21 wherein said snapshot and said signature are stored in said second object, said second object limiting access to said snapshot through one or more methods of said second object.

23. The system of claim 22 wherein said one or more methods of said second object invalidate said signature when said access modifies said snapshot.

24. A method for creating a signed object representing a state of a live object presently instantiated in a runtime environment, the live object containing dynamic data, comprising:

instantiating the signed object, wherein the instantiating creates a snapshot array and a signature array associated with the signed object;

invoking a method of the signed object to capture the state of the live object, wherein the live object includes one or more non-static fields, each of the one or more non-static fields capable of including non-static information that can change during instantiation of the live object in the runtime environment, the state of the live object including information present in the non-static fields at the moment the state of the live object is captured;

storing the captured state of the live object in the snapshot array;

generating a signature associated with the captured state of the live object stored in the snapshot array; and storing the signature in the signature array.

25. A method for creating a sealed object representing an encrypted version of a state of a live object presently instantiated in a runtime environment, the live object containing dynamic data, comprising:

instantiating the sealed object, wherein the instantiating creates a snapshot array, a signature array, and an encryption array associated with the sealed object;

invoking a first method of the sealed object to capture the state of the live object, wherein the live object includes one or more non-static fields, each of the one or more non-static fields capable of including non-static information that can change during instantiation of the live object in the runtime environment, the state of the live object including information present in the non-static fields at a moment the state of the live object is captured;

storing the captured state of the live object in the snapshot array;

invoking a second method of the sealed object to create an encrypted version of the captured state of the live object stored in the snapshot array;

storing the encrypted version of the captured state of the live object in the encryption array; and removing the captured state of the live object from the snapshot array.

26. The method of claim 25, further comprising:

generating a signature associated with the captured state of the live object stored in the snapshot array, wherein the generating is performed prior to invoking the second method of the sealed object; and storing the signature in the signature array.

* * * * *